Figure 1:
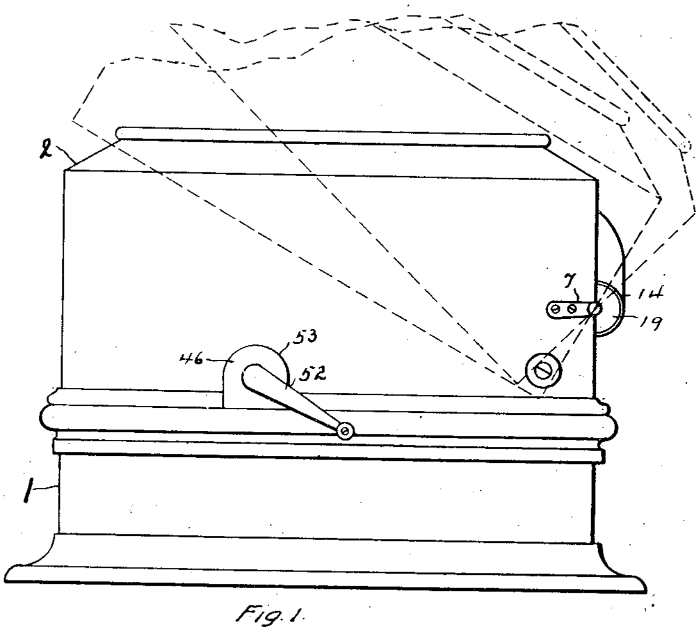

P. CATUCCI.
TALKING MACHINE.
APPLICATION FILED APR. 18, 1914.

1,137,001.

Patented Apr. 27, 1915.

9 SHEETS—SHEET 1.

WITNESSES:
M. L. Sanders
H. B. Smith

INVENTOR
Pliny Catucci
BY
Louis M. Sanders ATTORNEY

P. CATUCCI.
TALKING MACHINE.
APPLICATION FILED APR. 18, 1914.

1,137,001. Patented Apr. 27, 1915.

9 SHEETS—SHEET 2.

WITNESSES:
M. L. Sanders
H. B. Smith

INVENTOR
Pliny Catucci
BY
Louis M. Sanders ATTORNEY

P. CATUCCI.

TALKING MACHINE.

APPLICATION FILED APR. 18, 1914.

1,137,001. Patented Apr. 27, 1915.

9 SHEETS—SHEET 3.

WITNESSES:

M. J. Sanders

H. B. Smith

INVENTOR

Pliny Catucci

BY

Louis M. Sanders

ATTORNEY

P. CATUCCI.
TALKING MACHINE.
APPLICATION FILED APR. 18, 1914.

1,137,001. Patented Apr. 27, 1915.

9 SHEETS—SHEET 4.

WITNESSES:
M. Sanders
H. B. Smith

INVENTOR
Pliny Catucci
BY
Louis M. Sanders ATTORNEY

P. CATUCCI.

TALKING MACHINE.

APPLICATION FILED APR. 18, 1914.

1,137,001.

Patented Apr. 27, 1915.

9 SHEETS—SHEET 5.

WITNESSES:

M. L. Sanders

H. B. Smith

INVENTOR

Pliny Catucci

BY

Louis M. Sanders ATTORNEY

P. CATUCCI.
TALKING MACHINE.
APPLICATION FILED APR. 18, 1914.

1,137,001.

Patented Apr. 27, 1915.

9 SHEETS—SHEET 6.

WITNESSES:
M. L. Sanders
H. B. Smith

INVENTOR
Pliny Catucci
BY
Louis M. Sanders ATTORNEY

WITNESSES:
M. F. Sanders
H. B. Smith

INVENTOR
Pliny Catucci
BY
Louis M. Sanders ATTORNEY

P. CATUCCI.
TALKING MACHINE.
APPLICATION FILED APR. 18, 1914.

1,137,001.

Patented Apr. 27, 1915.

9 SHEETS—SHEET 8.

WITNESSES:
M. L. Sanders
H. B. Smith

INVENTOR
Pliny Catucci
BY
Louis M. Sanders ATTORNEY

P. CATUCCI.

TALKING MACHINE.

APPLICATION FILED APR. 18, 1914.

1,137,001.

Patented Apr. 27, 1915.

9 SHEETS—SHEET 9.

WITNESSES:

M. L. Sanders

H. B. Smith

Pliny Catucci INVENTOR

BY

Louis M. Sanders ATTORNEY

UNITED STATES PATENT OFFICE.

PLINY CATUCCI, OF NEWARK, NEW JERSEY, ASSIGNOR TO A. F. MEISSELBACH & BROTHER, A CORPORATION OF NEW JERSEY.

TALKING-MACHINE.

1,137,001. Specification of Letters Patent. Patented Apr. 27, 1915.

Application filed April 18, 1914. Serial No. 832,710.

*To all whom it may concern:*

Be it known that I, PLINY CATUCCI, a citizen of the United States, residing in the city of Newark, county of Essex, and State of New Jersey, have invented certain new and useful Improvements in Talking-Machines, of which form is a specification.

Hitherto it has been the practice to provide for the amplification of the sound waves by means of a horn supported above the disk record and capable of adjustment either in a horizontal plane or a vertical plane, or in some cases both in horizontal and vertical planes. Other forms of talking machine known as the hornless talking machine provide for the amplification of the sound waves by conducting the same beneath the disk record and through the case of the machine which in itself comprises a sound amplifier. In this case the body of the machine is made considerably higher in order to afford sufficient space beneath or around the motor mechanism to form the proper exit for the sound waves. In the latter form of talking machine no means for adjusting the direction of the sound waves is provided other than the shifting of the entire machine around in various positions so that the exit for the sound waves may be directed to different points, but always away from the machine in a substantially horizontal plane, so that they have a tendency to follow a plane two or three feet from the floor. It can be readily shown, and has been repeatedly proven that the so called hornless talking machine gives a musical rendition much inferior in value and harmony to the so called horn style of machine. One of the reasons for this is the necessary reduction of the size of the amplifier due to lack of space, but still more is due to the location of the amplifier itself. In the hornless machine the outlet or exit for sound waves is ordinarily much lower than the ear of the auditor. In this type of talking machine it is customary to have a hinged lid or cover which may be raised for the purpose of applying or removing a disk record from the record support or turn table and thereafter the lid or cover is again lowered over the case of the machine; thus the lid or cover has been made use of to so inclose the motor as to deaden the necessary noise of its running so as not to let it interfere with the reproduction of the record itself. Other forms of talking machines have been proposed, but for one reason or another they have not become commercially successful or sufficiently popular to warrant their continued manufacture.

My improved talking machine has for its principal objects the reduction in the height of the motor case and the corresponding increase in the height of the cover or lid so that the sound waves may be conducted up through the cover or lid which is so formed as to make a perfect sound amplifier which is adjustable in a vertical plane.

Another feature of my invention resides in the connection between the tone arm and the amplifier lid or cover, together with the means for softening or muffling the sound waves as they emerge from the tone arm.

A still further feature of my invention resides in the adjustable automatic stop mechanism whereby upon completion of the rendition of the record, the rotation of the turn table is automatically stopped.

Another and quite important feature of my invention resides in the means for varying the speed of the motor so as to render a record at the exact speed or tempo at which it was originally designed to be played. It is a well known fact that each manufacturer of phonograph or talking machine records designs his own records to be played at a certain predetermined speed, thereby making it impracticable to play such records upon any phonograph or talking machine except that upon which they are specifically designed to be played. These various speeds range from sixty revolutions of the turn table or record support to the minute up to as high as ninety revolutions to the minute. By the mechanism of my improved talking machine it is possible to so vary the speed of the machine as to adapt it for all of the various records now on the market.

Figure 2:
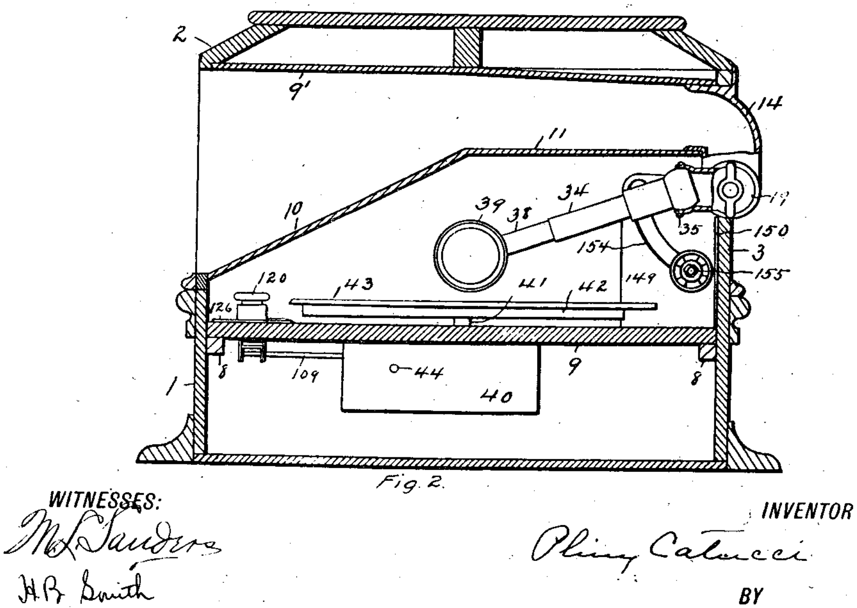
Figure 3:
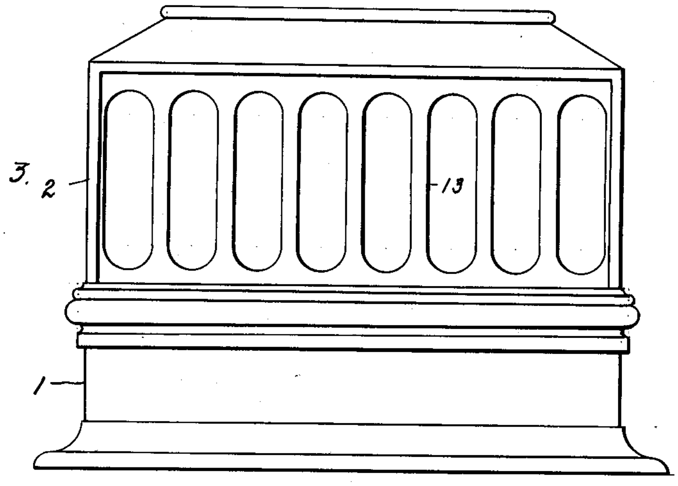
Figure 4:
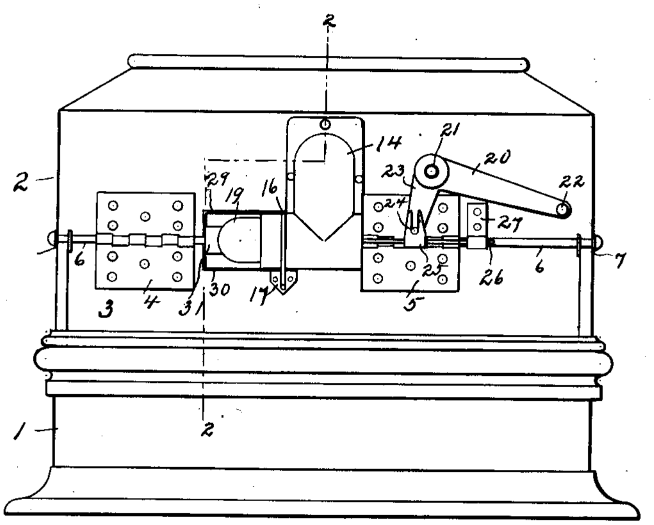
Figure 5:
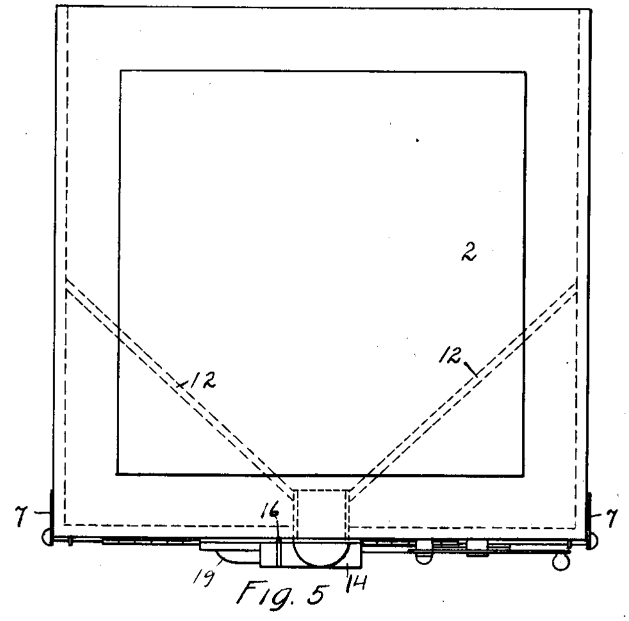
Figure 6:
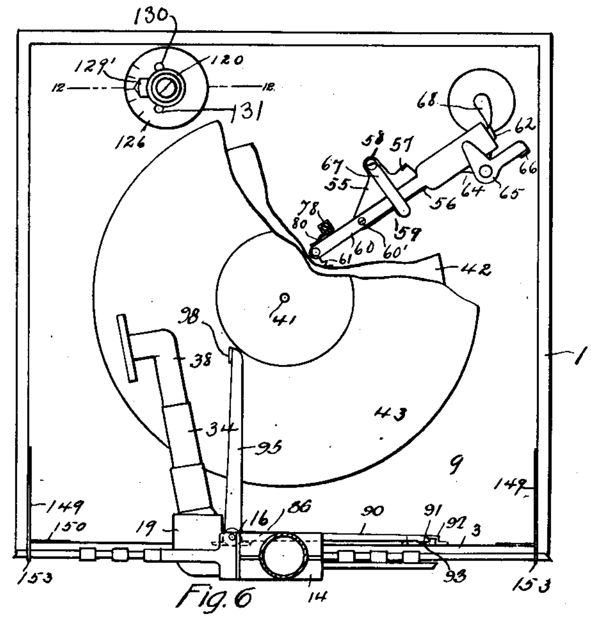
Figures 7, 8, 9:
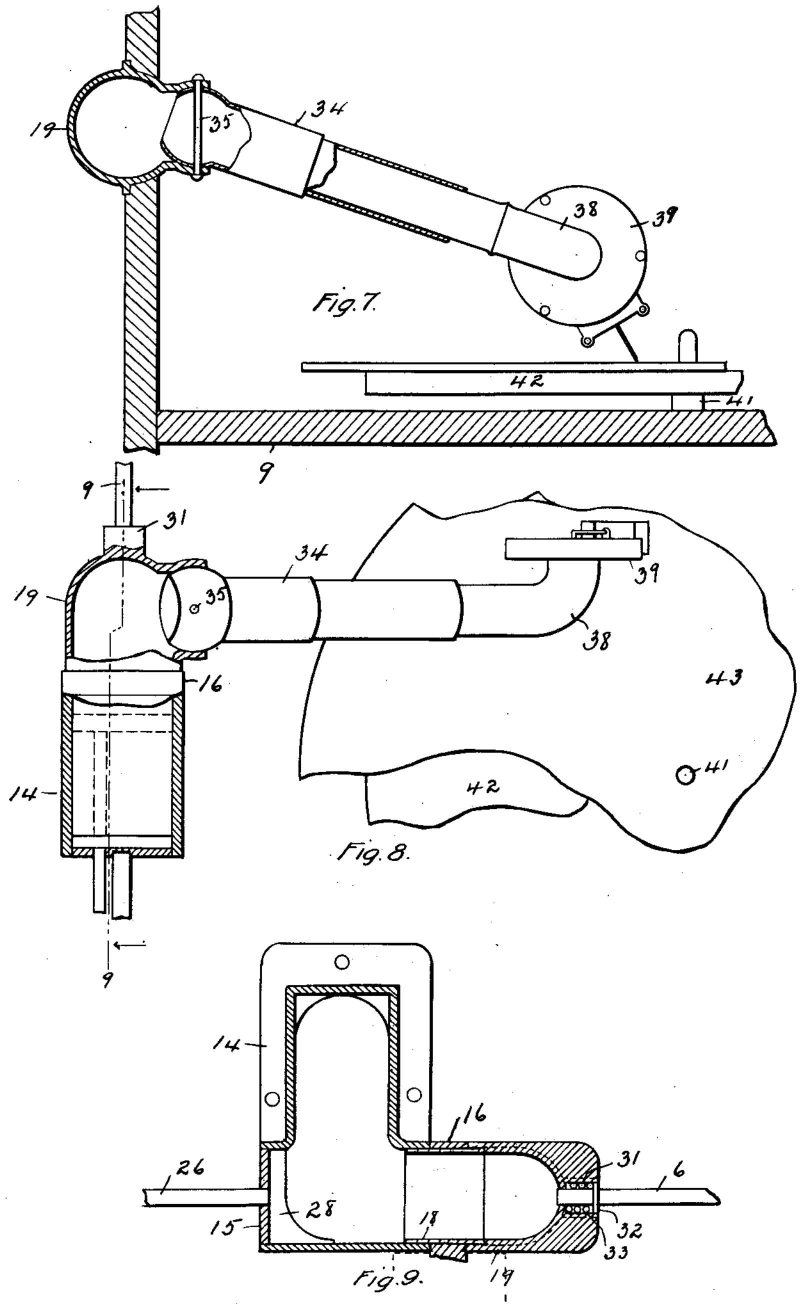
Figure 11:
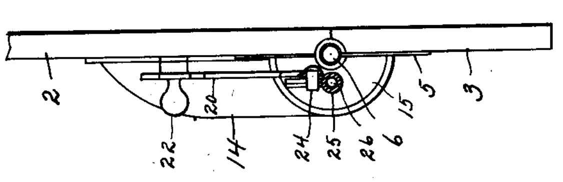
Figure 10:
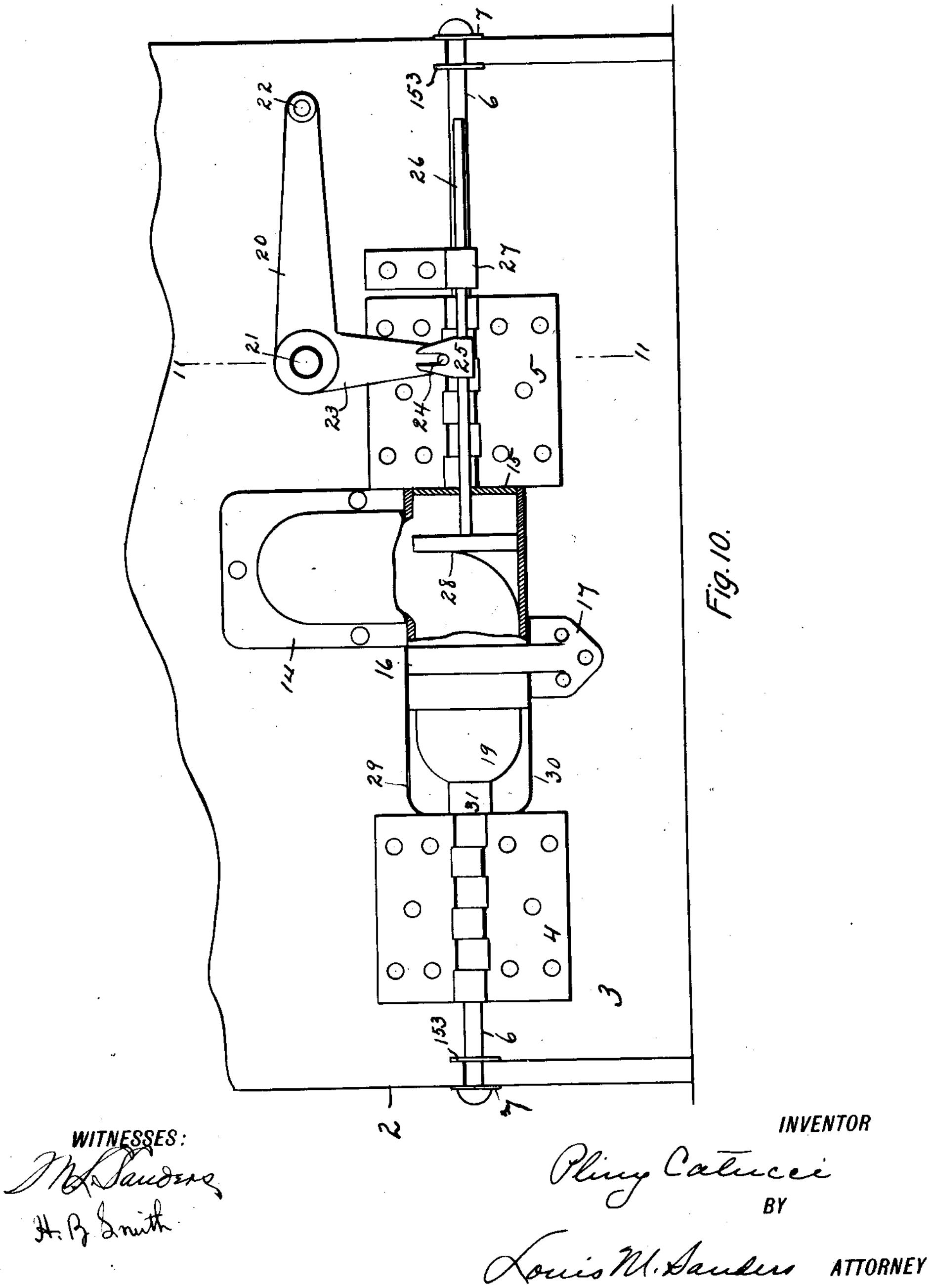
Figures 12, 13:
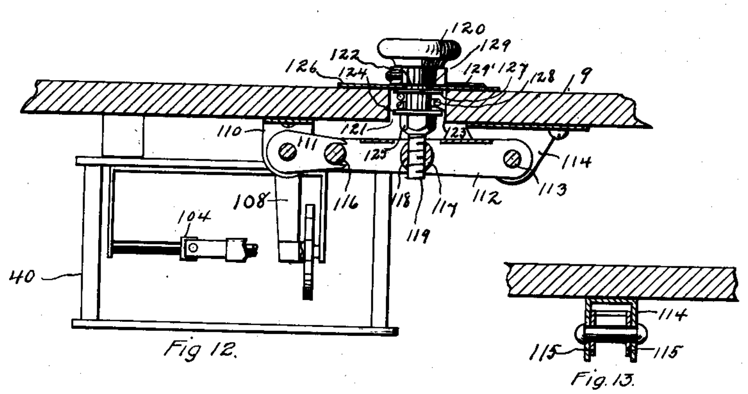
Figure 14:
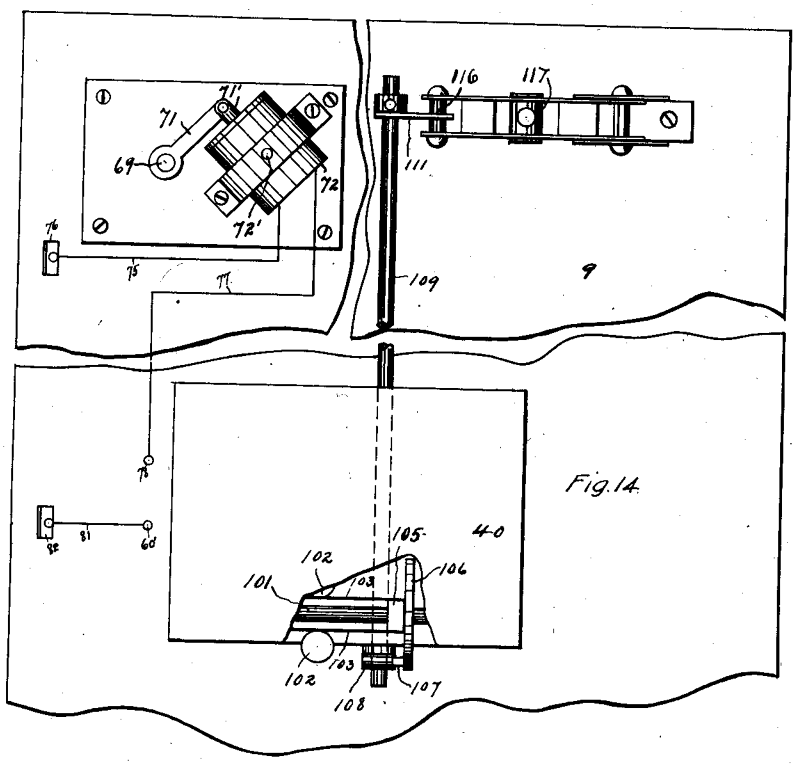
Figure 15:
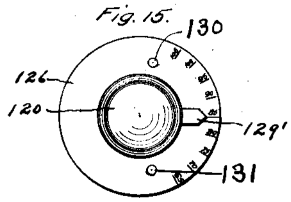
Figures 16, 25, 26:
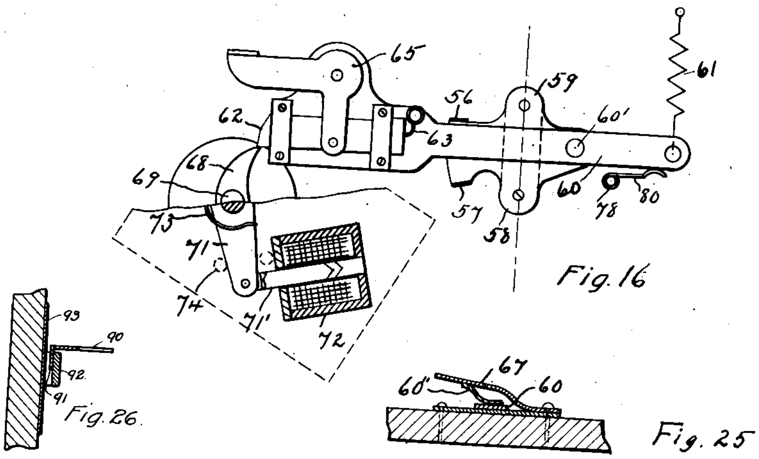
Figure 17:
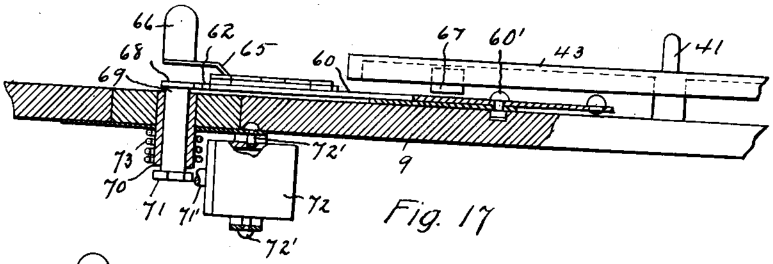
Figure 18:
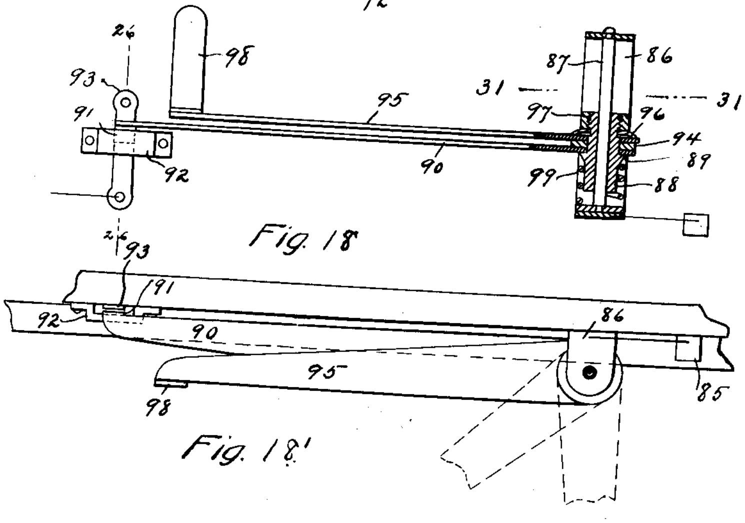
Figure 19:
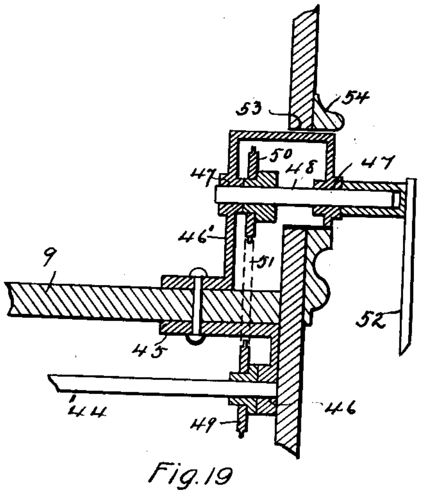
Figure 20:
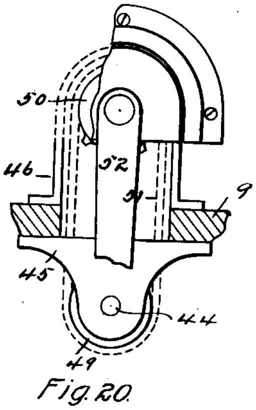
Figures 21, 22, 23, 24:
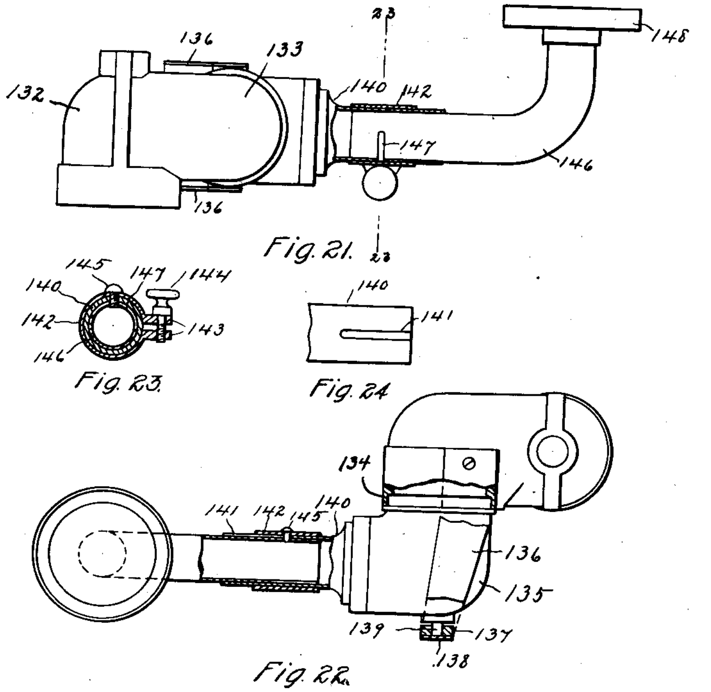
Figure 31:
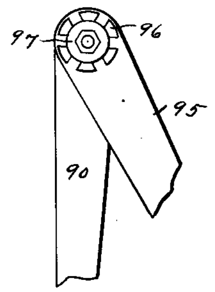
Figure 27:
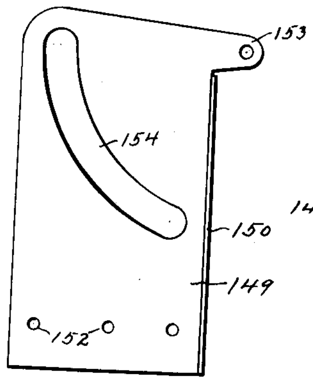
Figure 28:
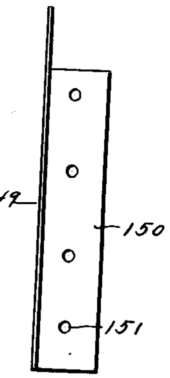
Figure 29:
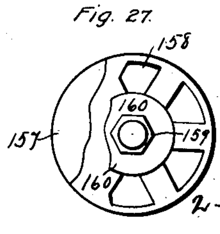
Figure 30:
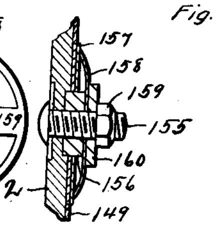
Figure 32:
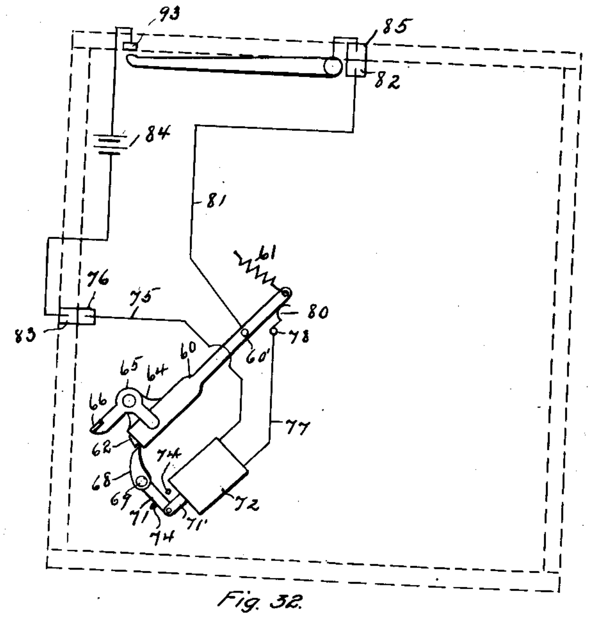

In the accompanying drawings forming a part of this specification Figure 1, is a side elevation of the talking machine case showing in dotted lines the cover-amplifier in adjusted positions. Fig. 2, is a vertical section on line 2—2 of Fig. 4 showing location and vertical section of the amplifier and also showing in side elevation one form of tone arm. Fig. 3, is a front elevation of the talking machine showing the cover down and the lattice outlet of the amplifier. Fig. 4, is a rear elevation of the case showing the outside connection between the tone arm and the cover amplifier, also illustrating the mechanism for operating the muffler. Fig. 5, is a top plan view showing in dotted lines the contour of the amplifier within the cover. Fig. 6, is a top plan view of the case with the cover removed with a part of the record and its table broken away to show the location of the stop mechanism. Fig. 7, is a side elevation partly in section of the tone arm and the connection leading to the amplifier. Fig. 8, is a top plan view partly in section of the tone arm. Fig. 9, is a vertical section of the tone arm connection drawn on line 9—9 of Fig. 8 looking in the direction of the arrow. Fig. 10, is a rear view of the hinge connection showing the muffler mechanism partly in section together with mechanism for operating same. Fig. 11, is a vertical section on line 11—11 of Fig. 10. Fig. 12, is a vertical section on line 12—12 of Fig. 6. Fig. 13, is a vertical section through the supporting bracket. Fig. 14, is a bottom plan view of the motor supporting plate or table showing the relative location of the mechanism secured to said plate, but broken away and condensed to show the operating parts within the range of the drawing. Fig. 15, is a plan view of the motor regulator. Fig. 16, is a top plan view partly in section of the stop mechanism. Fig. 17, is a side elevation partly in section of the same. Fig. 18, is a front elevation of the contact mechanism which operates the stop mechanism. Fig. 18′, is a plan view of the same. Fig. 19, is a section through the counter shaft winding mechanism. Fig. 20, is a side elevation, partly in section of the same. Fig. 21, is a plan view of a modified form of tone arm. Fig. 22, is a side elevation of the same. Fig. 23, is a cross section on line 23—23 of Fig. 21. Fig. 24, is a detached view of the end of one of the sections of the tone arm. Fig. 25, is a sectional view of the stop mechanism. Fig. 26, is a section on line 26—26 of Fig. 18. Fig. 27, is a side elevation of the friction hinge for the cover. Fig. 28, is an edge view of the same. Fig. 29, is a side view partly in section of the friction washers used in connection with the friction hinge. Fig. 30, is a vertical section through the center of the friction washers. Fig. 31, is a plan view on line 31—31 of Fig. 18. Fig. 32, is a plan view of the circuit connection for operating the electric stop mechanism.

Similar reference numerals refer to like parts throughout the specification and drawings.

In Fig. 1, I have shown a side elevation of the talking machine case which comprises the rectangular box 1, and the amplifier-cover 2. The rear side of the box extends upwardly to a point substantially one half of the height of the cover 2 as shown at 3, and the hinge connection between the cover 2 and the extension 3 is along the upper edge of said extension 3 as clearly illustrated in Fig. 4. The two hinges 4 and 5 have their parts similarly arranged and secured respectively to the rear of the cover and to the upper edge of the extension 3 with the hinge pintles 6 located on the outside of the case, and the outer extremities of said pintles inserted into two apertured lugs 7 secured to the outer sides respectively of the cover as clearly shown in Figs. 1 and 5. Within the box 1, is provided a ledge 8, running completely around the inner surface of the box and serving as a support for the plate or table 9, which latter is detachable and is utilized for supporting the motor and other appurtenances of the machine. Within the cover is located the amplifier, the contour of which is shown in Figs. 2 and 5. It consists of a partition board 9′, secured in the top of the cover as shown in Fig. 2, and extending from the front of the same to the rear, and also of the inclined board 10, extending from the lower edge of the front of the cover to a point about midway of the cover and from that point extending substantially horizontally as at 11. Diagonally arranged partition boards are shown in Fig. 5 at 12 which lead from points midway of the sides on the cover to the rear of the same so as to provide a substantially funnel shaped opening, leading from the tone arm hereinafter to be described. The forward end of the amplifier may either be left open for the outlet of the sound waves, or it may be provided with a grille or lattice work substantially as shown in Fig. 3 at 13. If desired the inner face of this lattice work grille may be covered with gauze or any suitable fabric to prevent the ingress of dirt or dust.

To the middle of the rear side of the cover is rigidly secured the elbow-T, 14, the rear side of the cover being cut away to permit the open end of the elbow-T to communicate with the small tapered end of the amplifier as shown in Figs. 2 and 5. The T part of the elbow-T is concentric with the pintles 6, one of which terminates on the one side within an aperture formed in the closure head 15 of the T. At the opposite end of the T 14, is a ring 16 abutting against the end of the T as shown in Figs. 4, 5 and 6, said ring being provided with a flat flange extension 17, the latter being secured to the rear of the box 3 as clearly shown in Fig. 4. Within this ring is a sleeve 18 rigidly secured to said ring and extending into the adjacent open end of the T as shown in Fig. 9, and extending in the opposite direction into the elbow connection 19 of the tone arm. This ring being thus secured is an additional hinge connection between the rear of the cover 2 and the upper extension 3, inasmuch as said ring is concentric with the hinge pintles 6.

Located a little above the hinge 5, is a bell crank 20 pivoted to the rear of the cover at 21. The free end of said bell crank is provided with handle 22, whereby it may be swung on pivot 21. The rectangular arm 23 of the bell crank extends downward and outside of the hinge 5, and is provided with a pin 24 at its lower end which takes into the open slot of a split sleeve 25, said sleeve being rigidly connected to a sliding rod 26, said rod being guided by the guide 27 rigidly secured to the rear of the cover as shown in Figs. 4 and 10. This rod 26, extends through the closed end 15 of the elbow-T 14 and at its inner end is connected to a piston muffler 28, the construction being such that by manipulating the bell crank 20, such piston muffler may be reciprocated within the T 14, so as to close all the connection between said elbow and tone arm connection 19.

The rear of the cover 2 is cut out at 29 as is also the extension 3 at 30 so as to permit of the oscillation of the elbow connection 19 upon ring 18. The end of the elbow connection 19 is provided with a spring socket 31 into which is inserted the adjacent end of the pintle 6 of the hinge 4, and upon the end of said pintle is rigidly secured a collar 32, which bears against a spring 33, the opposite end of said spring being located in said socket 31. This construction is such that the spring presses against the elbow connection 19 so that said connection bears with considerable friction against the ring 16, and thus the elbow and tone arm will remain in any position in which they may be placed because of such frictional engagement. The elbow connection 19 has its other or free end extending toward the center of the machine as indicated in Figs. 2 and 6, and is provided with a spherical opening as shown in Fig. 2 Within this spherical opening extends the inclined tone arm 34, the end of which is enlarged into spherical form to fit the spherical opening of connection 19. Extending substantially vertically through this spherical end of the tone arm, and the spherical socket opening is a pivot pin 35, the angle being such that the tone arm 34 when in playing position, will generate the surface of a cone, but through the frictional action of the opposite end of the elbow connection 19 with the ring 16, the tone arm may be elevated and lowered as desired for the purpose of placing the sound box upon the end of the tone arm into position to have its needle bear upon the surface of a disk record as will be fully hereinafter described. The normal position however of the tone arm 34 is as indicated in Figs. 2 and 7. The free end of the tone arm 34 is provided with an elbow tube 38 which extends into the tone arm 34 to some distance and may oscillate within the same so that the sound box 39 may be turned over into the playing position indicated in Figs. 2 or 7, or turned through an angle of about 135 degrees to permit the renewal of the needle.

The frictional engagement of the elbow connection 19, with the ring 16, the latter being firmly secured to the rear extension 3, of the box 1, will permit the raising and lowering of the cover 2, without in any manner interfering with the tone arm 34, so that the cover 2, with its amplifier may be elevated or lowered to direct the sound waves as desired without affecting the pressure of the sound box needle upon the record.

As hitherto stated, the plate or table 9, is utilized to support the motor and other operative parts of the mechanism. In Fig. 2, the motor 40, is shown inclosed in a box and inasmuch as it may be any desired or preferred form of motor, I have not deemed it necessary to illustrate the same in detail except so far as may be essential to gain a knowledge of the methods of its manipulation. As shown the motor is firmly secured to the under side of the plate or table 9, in such position that the driving shaft 41, extends through and above the plate 9, to receive upon its upper end the detachable turn table 42, upon which is located the disk record 43, in position to permit the sound box to be lowered into playing position. The winding shaft 44, for winding up the spring of the motor extends laterally to the side of the box 1, as shown in Fig. 19. If said shaft were extended outside of the box, it would stand at a point so low down as not to permit the winding crank to have full sweep when the talking machine case is placed upon a table. In order, therefore, to permit the free swing of the winding crank, I provide the following structure, namely: On the under side of the plate 9, I locate the bracket 45, providing the same with a bearing 46 for the end of the shaft 44. Above the plate 9, is a second bearing bracket 46′, hooded over as shown and provided with bearings 47 for a counter shaft 48 which extends beyond the side of the case. Upon the shaft 44 is located a sprocket wheel 49, rigidly secured thereto, and upon the counter shaft 48, is also located a sprocket wheel 50. Around these sprocket wheels is the sprocket chain 51. To the outer end of the counter shaft 48, is detachably secured the winding crank 52. It will thus be seen that by the use of the counter shaft 48, and its connection to the winding shaft 44, I am able to wind the motor with the winding crank 52, of a length sufficient for the purpose.

Inasmuch as the hood of the bracket 46′, extends above the side of the box 1, it is necessary to cut out a notch 53, in the side of the cover 2, so that said cover may be lowered down into the position shown in Fig. 2, without interfering with the bracket 46′. If desired, I may place an ornamental cap 54, over this opening so that the projecting end of the bracket 46′, with the outside bearing 47, may be inclosed when the cover 2, is down.

As a means for stopping and starting the motor, I provide the following mechanism, reference being had to Figs. 6, 16, and 25. Referring to Fig. 6, 55 represents a plate secured to the upper side of the table 9. This plate 55, is provided with upturned lugs 56, and 57, together with lateral fastening arms 58, and 59. Pivoted to the end of the plate 55, is a lever 60, the short arm of which has connected to it a coil spring 61, the tendency of which is to throw the lever into a position bearing upon the upturned lug 57. The opposite end of the lever is provided with a spring bolt 62, normally projecting from the end of the lever, and held extended by means of a spring 63. The lever is provided with a lateral projection 64, upon which is pivoted an operating bell crank 65, which has the upturned finger piece 66. By pressing upon the outside of the finger piece 66, the bolt 62, may be pressed inwardly against the spring 63, and upon release, said spring will restore the bolt into the position shown in Fig. 16. Rigidly secured to the lug 58 of the plate 55, is a cambered spring 67, which is located over the lever 60. Upon the lever 60 is secured an upturned cam 60″, in position to bear upon the under side of the spring 67, so that as the lever 60 is swung from side to side, the free end of the spring 67 will be raised and lowered. The spring 67 is in position to bear upon the under side of the turn table 42 when the lever 60 is turned into a position to bear upon the lug 57; but because of the camber and elasticity in the spring 67, when the lever 60 is turned into position shown in Fig. 25, the spring 67 will drop away from the under side of the turn table 42, and thus permit the motor 40, to drive the turn table 42. If desired, I may provide the upper face of the camber spring 67, with a layer of leather or paper or any friction material by which the frictional engagement of said spring with the under side of the turn table 42, may be made more effective.

As a means for holding the lever 60, in the position shown in Fig. 16, I provide a pawl 68, pivoted upon vertical shaft 69, the point of said pawl being in a position to engage the point of the bolt 62, as clearly shown in Figs. 6, and 16. When the pawl 68, is released from the point of the bolt 62, it will be readily seen that the spring 61, will swing the lever 60, over against the stop lug 57, carrying with it the cam upon such lever into engagement with the cambered spring 67, whereby as above explained, the rotation of the turn table 42, is stopped. As a means for automatically disengaging the pawl 68, from the bolt 62, I provide the following mechanism. The shaft 69, extends through a bearing 70, firmly secured in the plate or table 9, and is provided upon its lower end with a lever 71, to the end of which is pivotally secured an armature 71′, of the ironclad magnet 72. Surrounding the bearing 70, and having one end secured thereto is a spring 73, the opposite end of which spring is carried around and bent over the lever 70, so that it has a tendency to hold the pawl 68, in position to engage the point of the bolt 62, as shown in Fig. 16. This action also withdraws the armature 71, from the ironclad magnet 72. The ironclad magnet 72, is pivoted in vertical trunnions 72′, so that it may have a slight oscillation as this armature 71, reciprocates within its core. In this manner the binding of the armature and magnet is prevented. From this mechanism it can be readily seen that the normal tendency of the spring 73, is to hold the shaft 69, with the arm 70, against the stop pin 74, while the pawl 68, is held in the position illustrated in Figs. 6, and 16. When the lever 60, is swung around into the position shown in these two figures, the point of the bolt 62, will depress the pawl 68, against the action of the spring 73, so as to snap over it and be held in position to release the cambered spring 67, from the under side of the turn table 42, thereby permitting free rotation of said turn table. When, therefore, the magnet 72, is energized, the armature 71 will be suddenly drawn into its core, thereby releasing the pawl 68, from the point of the bolt 62, whereupon the spring 61, will pull the lever 60, around against the upturned lug 57. The cam upon the lever 60, will then bear upon the under side of the cambered spring 67, raising its free end into contact with the under side of the turn table 42, and thereby stopping rotation of said turn table. I will now proceed to describe the mechanism for energizing the magnet 72, whereby the action just described is brought about. Referring now to Fig. 14, the circuit which includes the magnet 72, is partially shown. Leading in wire 75, is carried from a contact spring 76, secured upon the under side of the plate or table 9, to the magnet 72. The other terminal wire 77, leading to the magnet is carried to the binding screw 78, which passes through the plate or table 9, and has secured at its upper end, the contact spring 80, in position to engage the side of the lever 60, when said lever is in the position indicated in Fig. 16. The lower end of the pivot 60′, of the lever 60, is connected by means of the wire 81, to a contact spring 82, located upon the under side of the plate or table 9, adjacent to the edge of the same. The two contact springs 76, and 82, are so located upon the under side of the plate or table 9, that they respectively bear upon the two contact plates 83, and 85, secured to the ledge 8. The circuit wire leads from the contact plate 83, to one terminal of an electric battery 84, which may be conveniently located in the box 1. The other battery wire leads from the battery 84, to contact plate 93, secured upon the rear side of the box 2. The wire leading from the contact plate 85, is carried within the box 2, to the pivot plate 86, also secured to the rear side of the box 2, so that when the contact hereinafter referred to is closed the circuit will be completed through the magnet 72, thereby energizing the same and actuating the pawl 68, to release the lever 60. The contacts just referred to are as follows: The pivot plate 86, hitherto referred to carries a pivot pin 87, upon which is rigidly secured a sleeve 88, shouldered at 89. Bearing upon the shoulder 89, is a contact arm 90, extending parallel to the rear side of the box 1, with its outer extremity in close proximity to the contact point 93. This arm 90, is rigidly secured to the sleeve 88, and said arm and sleeve together with the pivot pin have a very minute oscillation in the pivot plate 86. The oscillation however, is limited by reason of the fact that the outer end of the arm 90, has a downwardly extended projection 91, which is inserted behind loop 92, the latter being rigidly secured to the rear of the box 1. The coil spring 99, has a tendency to hold the projection 91, against the loop 92, and away from the contact 93. Just above the contact arm 90, and surrounding the sleeve 88, is the spacing washer 94, above which is located the friction arm 95, which is rotatively mounted upon the sleeve 88, and is held against the washer 94, by means of the star spring washer 96, the pressure of the latter being adjusted by means of the nut 97, which is screw threaded to the upper end of the sleeve 88. In this manner the friction arm 95, may be adjusted around the sleeve 88, to any desired point. The lightness of the spring 99 is such that the slightest touch upon the arm 95, will cause the projection 91, to contact with the contact plate 93. The outer free end of the friction arm 95, has the upturned projection 98, which lies in the path of the tone arm 34.

In practice when it is desired to automatically stop the motor, the tone arm 34, is swung around over the record to a point where the needle may rest in the innermost groove of the record. The friction arm 95, is then swung around into contact with the rear side of the tone arm or its extension elbow 38, in which position the arm 95, is allowed to rest. The tone arm then is swung around back to the initial point of the record groove and the lever 60, is swung into the position shown in Figs. 6, and 16, whereupon the motor will start. Upon the completion of the record, the tone arm will have been carried by the record groove to its innermost convolution, at which point the elbow 38, will press against the upward projection 98, and as hitherto described, the lightness of the spring 99, will not resist a further pressure which will carry the arm 90 into contact with the contact piece 93, thus establishing an electric circuit through the magnet 72, which operation will automatically release the pawl 68, and cause the automatic stoppage of the motor. In Fig. 32, I have shown a diagram of the circuit closing mechanism so arranged that the removal of the plate or table 9, will not disturb the circuit wires in the least. The battery 84, as hitherto described may be located in the box 1, with one of its poles connected to the contact plate 93, and the other pole connected to the contact plate 83. The contact plate 83, is so located upon the ledge 8, as to register with the contact spring 76, which latter is secured to the plate or table 9, with the connection wire 75, leading therefrom to the magnet 72. The wire 77, as shown in Fig. 32, leads to the binding post spring 78, which latter carries the spring 80, located in position to bear upon the side of the lever 60, when the latter is in the position shown. The circuit wire 81, connects the pivot 60′, with the contact spring 82, secured to the edge of the plate or table 9, in position to bear upon a contact plate 85, which latter is directly connected to the pivot plate. Thus metallic connection of the circuit is complete when the arm 90, closes with the contact 93. In Figs. 12, 13, and 14, I show in detail the mechanism for regulating the speed or tempo at which the record is played. In Fig. 14, I show so much of the motor 40, as is necessary to gain an understanding of the methods of regulating it. The governor 101, is of the usual type, having the two balls 102 secured to flat springs 103, the right end of which as shown in Fig. 14, are rigidly secured to the collar 104. The opposite ends of the springs 103, are secured to the sliding collar 105, and to the latter is secured the disk 106. This is the usual governor for regulating the speed of the motor when taken in connection with a brake. The brake which I have shown consists of a piece of felt or other friction material 107, secured in the free end of an arm 108, which in turn is adjustably secured upon the end of a rock shaft 109. Suitable bearings for the rock shaft are mounted upon the upper side of the upper motor plate, but are not shown in the drawings. The shaft 109, extends to the forward side of the plate or table 9, where it is supported in the bearing 110. It is provided with a rock arm 111, rigidly secured thereto and lying parallel to the under face of the plate 9. It is understood that the rock shaft 109, together with the rock arms 108, and 111, are substantially rigid and when said rock arm is oscillated to a point where the friction brake 107, bears against the disk 106, the friction will be sufficient to check the motor. However, as the rock arm 108, is oscillated away from the disk 106, the motor will speed up and the centrifugal force will cause the governor balls 102, to fly outward, thus bringing the sliding collar 105, with the disk 106, against the friction piece 107, thereby limiting the speed of the motor, as is well known. The means for oscillating the shaft 109, consists of the lever 112, pivoted at 113, in the bracket 114, upon the under side of the plate or table 9. The lever 112, consists of a plate blanked out, and having its edges bent at right angles to the plane of the plate as shown in Fig. 13, so as to form the downwardly extended flanges 115. The forward end of the lever is provided with a cross pin 116, which receives the adjacent end of the rock arm 111. Midway between the pivot pin 113, and the cross pin 116, is located a cross head 117, journaled in the side flanges 115, of the lever. This cross head has a central screw threaded aperture 118 which receives the threaded end 119 of the regulating thumb screw 120, which latter extends through an aperture 121 in the plate or table 9. This thumb screw is provided with the two shoulders 122 and 123, and against the latter shoulder rests the washer 124, held in place by means of the nut 125, which latter is screwed upon the stem 119. The larger diameter of the thumb screw 120 bears upon the index plate 126. Bearing against the under side of the plate 126 is the washer 127, and between said washer and the washer 124 is the compression spring 128.

Between the head of the thumb screw 120 and the plate 124 is located a friction ring 129, having the laterally projecting pointer 129′ to register with the various divisions upon the index plate 126. The spring 128 bearing as it does upon the washer 127, will produce considerable friction between the index plate 126 and the ring 129, so that the turning of the thumb screw 120, to bring the pointer 129′ to register with the various divisions on the index plate 126, will be resisted by such friction and thus there will be no danger of the accidental displacement of the regulating mechanism. The turning of the thumb screw 120 in one direction or the other, will raise or lower the lever 112, and the raising or lowering of this lever produces a rocking of the shaft 109, and a consequent movement of the friction felt 107, toward and away from the disk 106. The degree of this oscillation is very minute to cover the various speeds between sixty and ninety revolutions per minute of the turntable 42, and for this reason it is essential that the multiplying lever 112 be introduced into the structure, or at least some mechanism which will permit of a considerable range for the index finger, around the divisions of the index plate 126. By this mechanism I am enabled to obtain all of the various speeds for the turntable, which are requisite to the proper rendition of the various records now on the market. If greater or less speed of the turntable is desired or necessary, more divisions upon the index plate 126 may be provided, and the stop pins 130 and 131, may be located at a greater distance apart.

In Figs. 21 to 24, I have shown a slight modification of the tone arm over that shown in Figs. 7 and 8. In this modification, the elbow-T 14, and the friction ring 15 remain the same. The tone arm elbow 132 however, is somewhat modified, inasmuch as I dispense with the spherical socket in the same and substitute an elbow 133, to the lower end of which I provide a bearing 134, to receive a second elbow connection 135, which latter is pivoted to swing in the bearing 134. In order to form a convenient means for connecting the two parts 132 and 135, I provide the saddle 136, the upper ends of which are secured to the sides of the elbow 133, with a pivotal bearing 137 located upon the horizontal part 138 of said saddle. In said pivotal bearing rests the pivot 139, which extends downwardly from the elbow 135. Rigidly secured in the elbow 135 at its free open end is the tone arm 140, the outer end of which is longitudinally slotted as at 141. Surrounding this tone arm 140 is the sliding split sleeve 142, provided with the laterally projecting lugs 143 in which is located the thumb screw 144, the purpose of which is to clamp the split sleeve rigidly in adjusted positions along the tone arm 140. Projecting through a screw threaded aperture in the top side of the split sleeve 142, is a small screw 145, of sufficient length to extend into and through the slot 141, and beyond the interior of the tone arm some little distance. Extending into the tone arm 140, as shown in Figs. 21 and 22, is the elbow extension 146, which is circumferentially slotted as at 147 to receive the inner end of the screw 145. The slot 147 extends around the circumference of the elbow 146 through an angle of about 135 degrees. It will thus be seen that the elbow connection 146 may be oscillated within the tone arm 140 to a sufficient distance to permit the swinging of the sound box 148 into position to permit the insertion and removal of the sound box needle. The construction also permits of the longitudinal extension of the tone arm through the loosening of the thumb screw 144, and the sliding of the sleeve 142 along the same substantially the length of the slot 141, and wherever adjusted, the thumb screw 144 will be screwed home to hold the elbow extension 146 in place, against longitudinal shifting. This however does not prevent the oscillation of the elbow extension 146 within the tone arm.

In Figs. 27 to 30, I show the details of the friction mechanism whereby the cover 2 may be held in adjusted positions in a vertical plane, so that the sound waves may be directed at various angles from the amplifier. This friction mechanism consists primarily of the angle plate 149, of the general contour shown in Fig. 27. The vertical flange 150 projects at right angles from the plane of said plate, and is provided with a series of screw holes 151, by which said plate is rigidly secured to the upward extension of the box 1. A second series of screw holes 152 is utilized for securing the broad flat surface of the plate to the upper edge of the inside of the box 1 above the ledge 8. At the upper right hand corner of the plate is the apertured lug 153, through which the pintle 6 passes. In the broad surface of the plate is a circular slot 154, which is concentric with the aperture in the lug 153. Referring to Figs. 1 and 2, it will be noted that at the lower right hand corner of the cover is a bolt 155. This bolt passes through the side of the cover and extends through the slot 154 of the plate 149. The slot 154 is somewhat wider than the diameter of the bolt 155, to receive the filling washer 156. Bearing against the outside of the plate 149 is a friction washer 157, against which is the spring star wheel 158, the arms of which are cambered so as to bear with considerable friction against the washer 157, when the nut 159 is screwed upon the inner end of the bolt 155. I may insert a washer 160 underneath the nut 159 in order to increase the bearing area of the nut 159. It is to be understood that the friction plate 149 is duplicated on the other side of the cover and box, but since they are of the same general contour, the one being a right and the other a left, the illustration of one is deemed sufficient.

I claim,

1. In a talking machine, the combination of a motor box, with a hinged cover, a tone arm, an amplifier within said cover, a connection between said tone arm and said amplifier concentric with the hinge of said cover, and frictional means for holding said cover and amplifier in adjusted positions.

2. In a talking machine, the combination of a motor box, with a combined amplifier and cover for said box, a friction hinge connection between said box and cover whereby said cover may be adjusted to any degree of angularity in a vertical plane, a tone arm, a connection between said tone arm and said amplifier, and a friction hinge connection between said tone arm and said box whereby said tone arm may be adjusted in a vertical plane independently of the amplifier and without breaking the connection between said tone arm and said amplifier.

3. In a talking machine, the combination of a motor box, with a sound amplifier pivotally mounted upon said box to swing in a vertical plane, a tone arm frictionally connected to said box and amplifier to swing in a vertical plane, and a series of friction plates, connected to said box and amplifier for holding said amplifier in adjusted position relatively to said box.

4. In a talking machine, the combination of a motor box, with a sound amplifier pivotally mounted thereon to swing in a vertical plane, a slotted friction plate rigidly mounted upon said box, a second friction plate carried by said amplifier, and means for resiliently pressing said plates together whereby said amplifier will remain in any adjusted position.

5. In a talking machine, the combination of a motor box and turn-table, a motor within said box for driving said turn-table, a cover hinged to said box, having an amplifier fixed therein, adjustable friction mechanism connecting said cover and said motor box, for holding said cover in any desired angular position relatively to said box, and a tone arm frictionally connected to said amplifier for adjustment in a vertical plane, and carrying a sound box adapted to play a record mounted upon said turn-table.

6. In a talking machine, the combination of sound reproducing means, a box or case for inclosing said sound reproducing means, and comprising a cover hinged to said box, friction plates connected to said cover and to said box for holding said cover in adjusted position relatively to said box, a sound amplifier rigidly secured within said cover, and a tone arm communicating with said sound amplifier and frictionally connected to said box for adjustment in a vertical plane.

7. In a talking machine, the combination of a motor box, having its rear side extending above the upper edge of said box, a cover for said box pivotally mounted upon the upper edge of said extension, a sound amplifier rigidly mounted within said cover, means for holding said cover in adjusted position in a vertical plane and a vertically adjustable tone arm pivotally mounted upon the upper edge of said extension and having an elbow connection with said amplifier coaxial with said pivotal connection between the cover and extension.

8. In a talking machine, the combination of a sound amplifier pivoted to swing in a vertical plane only, a tone arm, a connection between said tone arm and said amplifier comprising a pair of mating elbows, a rigidly fixed friction ring located between said elbows whereby said tone arm may be held in vertically adjusted positions, and a vertical pivotal connection between one of said elbows and said tone arm whereby said tone arm may swing in a horizontal plane.

9. In a talking machine, the combination of a horizontally swinging vertically adjustable tone arm, a sound amplifier pivotally mounted to swing in a vertical plane, and a connection between said tone arm and said sound amplifier comprising a pair of connecting elbows and a ring fixed against rotation, and frictionally engaging the respective adjacent ends of said elbows.

10. In a talking machine, the combination of a motor box, and a cover pivotally connected thereto, a sound amplifier rigidly secured within said cover, a horizontally swinging vertically adjustable tone arm, and a connection between said tone arm and said amplifier comprising a pair of mating elbows, and a friction ring rigidly connected to said box and having frictional engagement with the mating ends of said elbows.

11. In a talking machine, the combination of a motor box, and a cover pivotally connected therewith, a sound amplifier rigidly secured within said cover, means whereby said cover and amplifier may be adjusted to various positions in a vertical plane, and a tone arm having/an elbow connection with said amplifier, one arm of said elbow connection being located concentrically with the pivotal connection between said cover and box.

12. In a talking machine, the combination of a motor box having an upward extension upon its rear side, a cover pivotally connected to the upward edge of said extension, a sound amplifier rigidly secured within said cover, means whereby said cover and amplifier may be adjusted to various playing positions in a vertical plane, and a tone arm having an elbow connection with said amplifier one arm of said elbow connection being located concentrically with the pivotal connection between said cover and the upper extension of said box.

13. In a talking machine, the combination of a motor box or case, a cover hinged to said box or case, a sound amplifier rigidly mounted in said cover, a swinging tone arm pivotally supported by said motor box, a tubular elbow having a horizontal arm between said amplifier and said tone arm, and a sliding piston in said tubular elbow with manually operated means mounted upon said cover for reciprocating said piston within said tubular elbow.

14. In a talking machine, the combination with a horizontally swinging, vertically adjustable tone arm and a vertically adjustable sound amplifier, a tubular elbow connection having a horizontal arm between the sound amplifier and said tone arm, a reciprocating piston in said elbow connection, and manually operated means for reciprocating said piston within said tubular elbow connection.

15. In a talking machine, the combination of a horizontally swinging vertically adjustable tone arm, a sound amplifier pivotally mounted to swing in a vertical plane, means for holding said sound amplifier in any adjusted position, comprising a fixed slotted plate, an apertured friction disk located on one side of said plate, and a screw-threaded bolt passing through said disk and the aperture in said plate and connected to said amplifier whereby said disk may be pressed into variable frictional engagement with the side of said fixed plate, and a connection between said tone arm and said amplifier comprising a pair of mating elbows, and a ring fixed against rotation and frictionally engaging the respective adjacent ends of said elbows.

16. In a talking machine, the combination of a motor box and a cover pivotally connected thereto, a sound amplifier rigidly secured within said cover, a horizontally swinging vertically adjustable tone arm, a tubular connection between said tone arm and said amplifier and means for holding said cover and amplifier in adjusted positions in a vertical plane comprising a plate rigidly secured to said motor box and having an arcuate slot concentric with the pivotal connection of said cover, and an apertured friction disk located on the inner face of said slotted plate with a bolt passing through the aperture in said disk and through said slot and connected to said cover whereby said disk engages said plate with greater or less friction.

17. In a talking machine, the combination of a motor box, a cover pivotally connected therewith, a funnel-shaped sound amplifier rigidly secured within said cover, and a tone arm having an elbow connection with said amplifier, one arm of said elbow connection being located concentrically with the pivotal connection between said cover and said box.

18. In a talking machine, the combination of a motor box or case with a hinged cover therefor, a sound amplifier rigidly mounted in said cover, a horizontally swinging vertically adjustable tone arm pivotally supported by said motor box, and a horizontal tubular elbow connection between said amplifier and said tone arm coaxial with the hinge connection between said motor box and said sound amplifier.

19. In a talking machine, the combination of a motor box, a cover pivotally connected therewith, means for holding said cover in any vertically adjusted position, a funnel-shaped sound amplifier rigidly secured within said cover, and a tone arm having an elbow connection with said amplifier, one arm of said connection being located concentrically with the pivotal connection between said cover and said box.

20. In a talking machine, the combination of a motor box or case with an adjustable cover hinged thereto, a sound amplifier rigidly mounted in said cover, means for holding said cover and amplifier in vertically adjusted positions, a horizontally swinging, vertically adjustable tone arm pivotally supported by said motor box, and a horizontal, tubular elbow connection between said amplifier and said tone arm co-axial with the hinge connection between said motor box and said cover.

21. In a talking machine, the combination of a motor box and a hinged cover therefor, a sound amplifier rigidly mounted in said cover, a horizontally swinging, vertically adjustable tone arm pivotally supported in said motor box, a horizontal, tubular elbow connection between said amplifier and said tone arm co-axial with the hinge connection between said motor box and said cover, and a reciprocating piston within said tubular elbow connection.

22. In a talking machine, the combination of a motor box and a hinged cover therefor, a sound amplifier rigidly mounted in said cover, a horizontally swinging, vertically adjustable tone arm pivotally supported in said motor box, a horizontal, tubular elbow connection between said amplifier and said tone arm co-axial with the hinge connection between said motor box and said cover, a reciprocating piston within said tubular elbow connection, and manually operated means for reciprocating said piston within said tubular connection.

PLINY CATUCCI.

In presence of—
L. M. Sanders,
W. A. Meyer.